US 6,669,867 B2

(12) United States Patent
Park et al.

(10) Patent No.: US 6,669,867 B2
(45) Date of Patent: Dec. 30, 2003

(54) OXIDE-BASED QUANTUM CUTTER METHOD AND PHOSPHOR SYSTEM

(75) Inventors: Woun-jhang Park, Boulder, CO (US); Christopher J. Summers, Dunwoody, GA (US); Young-rag Do, Seoul (KR); Do-hyung Park, Suwon (KR); Hong-geun Yang, Kyungki-do (KR)

(73) Assignees: Georgia Tech Research Corporation, Atlanta, GA (US); Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 09/987,697

(22) Filed: Nov. 15, 2001

(65) Prior Publication Data

US 2003/0089889 A1 May 15, 2003

(51) Int. Cl.$^7$ .......................... C09K 11/64; C09K 11/55
(52) U.S. Cl. .................................. 252/301.4 R
(58) Field of Search .................. 252/301.4 R

(56) References Cited

U.S. PATENT DOCUMENTS

| | | |
|---|---|---|
| 5,571,451 A | 11/1996 | Srivastava |
| 6,210,605 B1 * | 4/2001 | Srivastava et al. .... 252/301.4 R |
| 2002/0171356 A1 * | 11/2002 | Setlur et al. ................. 313/486 |

OTHER PUBLICATIONS

Srivastava et al.; "Luminescence of $Pr^{3+}$ in $SrAl_{12}O_{19}$: Observation of two photon luminescence in oxide lattice", *J. of Luminescence*, vol 71, pp. 285–290, (1997).

* cited by examiner

Primary Examiner—C. Melissa Koslow
(74) Attorney, Agent, or Firm—Leydig, Voit & Mayer, Ltd.

(57) ABSTRACT

A method of producing two visible light photons from an oxide-based phosphor doped with praseodymium (Pr) and including atoms of at least one activator in response to excitation with a single ultraviolet light photon. The method includes exciting the Pr of the oxide-based phosphor with a photon of ultraviolet light to excite an electron to an excited state, the excited electron falling to a lower energy state in a non-radiative transition and transferring energy to excite a first activator atom in the oxide-based phosphor, the first activator atom emitting a first photon of visible light, and the excited electron falling further to a lower energy state in a non-radiative transition, transferring energy to excite a second activator atom in the oxide-based phosphor, the second activator atom emitting a second photon of visible light. An oxide-based phosphor doped with praseodymium includes atoms of at least one activator and emitting two visible light photons in response to excitation by a single ultraviolet light photon.

6 Claims, 6 Drawing Sheets

OXIDE-BASED QUANTUM CUTTER METHOD AND PHOSPHOR SYSTEM

FIELD OF THE INVENTION

The present invention is directed to an oxide-based phosphor and a process including a oxide-based phosphor doped with praseodymium (Pr) and including at least one activator so that pumping with one photon of ultraviolet (UV) light produces two photons of visible light. The invention is particularly applicable to, but it not limited to, plasma display panels (PDP). These panels have gained increasing acceptance in display technology.

BACKGROUND

In the typical PDP, electrical discharges are produced in respective areas, i.e., pixels, addressed by electrical signals. The discharges occur within gases contained within the PDP, typically zenon and helium. The plasma discharge within these gases typically produces ultraviolet light, particularly vacuum ultraviolet (VUV) light with characteristic wavelengths at 147 nm and 172 nm which correspond to photon energies of 8.3 and 7.2 eV, respectively. This invisible light must be converted to visible light in order to produce an image on a PDP.

Typically, phosphors are employed for the conversion of the VUV light to visible light. A similar light energy conversion process is used in fluorescent lamps but is not desirable in PDPs because fluorescent lamps employ mercury which has delayed emission characteristics and adverse environmental considerations. Further, in a PDP, it is important that the phosphors produce colors to reproduce a color image. Many lamp phosphors have been successfully adapted to PDPs by enhancing the VUV light absorption properties and response times. However, the large energy difference between the pumping light and the emitted photons results in very low energy efficiency.

One approach to improving the energy efficiency is the use of a quantum cutter phosphor in which a high energy photon produces two lower energy photons. This process has been demonstrated in phosphors with fluoride-based lattices, such as $YF_3$ and $NaYF_4$. Quantum efficiencies for these quantum cutter phosphors exceeding 100% for visible light, i.e., light having wavelengths between 400 and 705 nm, have been reported. The quantum cutting phenomenon has been observed in an oxide phosphor lattice of $SrAl_{12}O_{19}$ doped with Pr. Nevertheless, the visible light quantum efficiency for this oxide-based lattice is relatively low because an energy transition producing a UV emission competes with the quantum cutting energy transitions that produce visible light. Other schemes employing quantum cutting in phosphors of $LiGdF_4$ and $GdF_4$ doped with europium (Eu) and producing two photons of the same color, i.e., red, with a conversion efficiency as high as 195% have been reported. The production of two photons with the same energy is a significant advantage over previous achievements with Pr-doped phosphors employing quantum cutting in which the two produced photons cover a wide spectral range, from infrared (IR) to UV.

In previous work with Pr-doped fluoride-based phosphor lattices, for example, $LaF_3$ and $NaYF_4$, the light emissions include a principal line having a wavelength at 407 nm and a second emission more clearly within the visible range and having a wavelength between 470 and 620 nm. An example is illustrated in FIG. 1. The energy levels and transitions involved in this process are schematically illustrated in FIG. 2. An electron of a $Pr^{3+}$ ion is excited to a 4f5d band by the absorption of an incident pumping UV photon. The exciter electron non-radiatively decays to the $^1S_0$ state. Then, the emitted light having a wavelength of 407 nm is produced from a $^1S_0$-$^1I_6$ transition, followed by another non-radiative energy loss of the electron into the $^3P_0$ level followed by a secondary radiative transition to various $^3F$ and $^3H$ levels. The latter transition produces visible luminescence at wavelengths between 420 nm and 650 nm. However, unless appropriate steps are taken to isolate some of the energy levels from the broad 4f5d band, the emission spectrum will be dominated by an intense UV emission. To avoid that result, a lattice with a weak crystalline field, such as a fluoride-based lattice, has been necessary to produce a useful quantum cutter phosphor. However, the fluoride-based lattices are unstable, preventing practical applications of those materials to PDPs and other applications, for example, lighting.

Oxide-based lattice phosphors are stable but have relatively strong crystalline fields. However, in oxide-based lattices with high coordination numbers, the crystalline field can be relatively weak. In addition, crystalline fields are expected to be reduced in strength in oxide-based lattices when doped with Pr, producing $Pr^{3+}$ ions within the lattice. It is on that basis that an $SrAl_{12}O_{19}$ phosphor lattice doped with Pr exhibiting the quantum cutting phenomenon has been demonstrated. However, the quantum efficiency of this oxide-based lattice phosphor fails to achieve the efficiencies observed for fluoride-based lattices and, therefore, have not been satisfactory.

SUMMARY OF THE INVENTION

Accordingly, it is an objective of the invention to provide an oxide-based lattice phosphor that is stable, that has a relatively weak crystalline field due to the presence of Al, that has a high coordination number, that can be doped with Pr, and that exhibits the quantum cutting phenomenon in which two visible photons are produced in response to a single high energy UV pumping photon.

It is a further objective of the invention to produce such a phosphor having a quantum efficiency exceeding that previously observed with such oxide-based lattice phosphors and, preferably, which exceeds the quantum efficiency of fluoride-based lattice phosphors.

A method of producing two visible light photons from an oxide-based phosphor doped with praseodymium and including atoms of at least one activator in response to excitation with a single ultraviolet light photon according to the invention includes exciting the Pr of the oxide-based phosphor with a photon of ultraviolet light to excite an electron to an excited state, the excited electron falling to a lower energy state in a non-radiative transition and transferring energy to excite a first activator atom in the oxide-based phosphor, the first activator atom emitting a first photon of visible light, and the excited electron falling further to a lower energy state in a non-radiative transition, transferring energy to excite a second activator atom in the oxide-based phosphor, the second activator atom emitting a second photon of visible light.

The first and second photons have the same wavelength.

An oxide-based phosphor doped with praseodymium according to the invention includes atoms of at least one activator and emitting two visible light photons in response to excitation with a single ultraviolet light photon.

The activator atoms according to the invention are chosen from manganese, terbium, and europium.

A preferred oxide-based phosphor lattice is $SrAl_{12}O_{19}$.

DETAILED DESCRIPTION

In the invention, an oxide-based lattice phosphor was developed using Pr doping in order to produce $Pr^{3+}$ ions in a lattice having a weakened internal crystalline field. Further, the lattice phosphor was designed so that resonant transfers of energy between atoms was avoided. Such resonant energy transfers increase energy transfer probabilities but seriously limit the possibility of developing phosphors employing quantum cutting that emit different colors of light. To achieve the different colors, similar resonant energy transfer mechanisms have to be found, severely limiting the design of the phosphor.

To achieve the desired energy transfers in the oxide-based lattice phosphor with the weakened internal crystalline field, activating atoms were added to the lattice for non-resonant energy transfer between excited electrons of the $Pr^{3+}$ ions and the activators. In this design, it is essential that two step energy transitions producing the quantum cutting phenomenon of the $Pr^{3+}$ ions be maintained without interference while achieving efficient coupling between the $Pr^{3+}$ ions and the activator atoms.

We concluded that good choices for activators are manganese (Mn), terbium (Tb), and europium (Eu). An important feature of the resulting lattices is that the Pr doping with Mn activator atoms and the Pr doping with Tb activator atoms employ non-resonant energy transfers, by contrast with previously known systems, such as the Gd-Eu system, that exploit resonant energy transfers.

Figure 1:
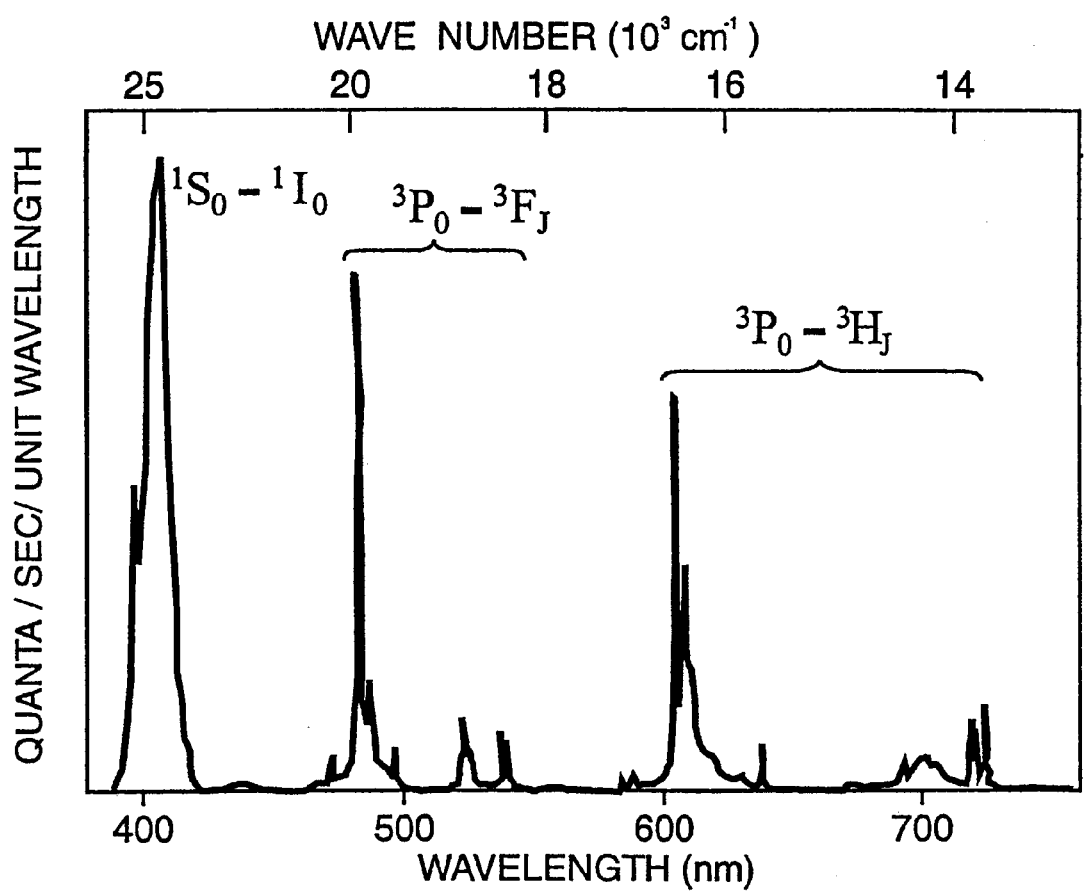
FIG. 1 is a graph showing the photoluminescence spectrum of a prior art $YF_3$ lattice phosphor doped with Pr.
Figure 2:
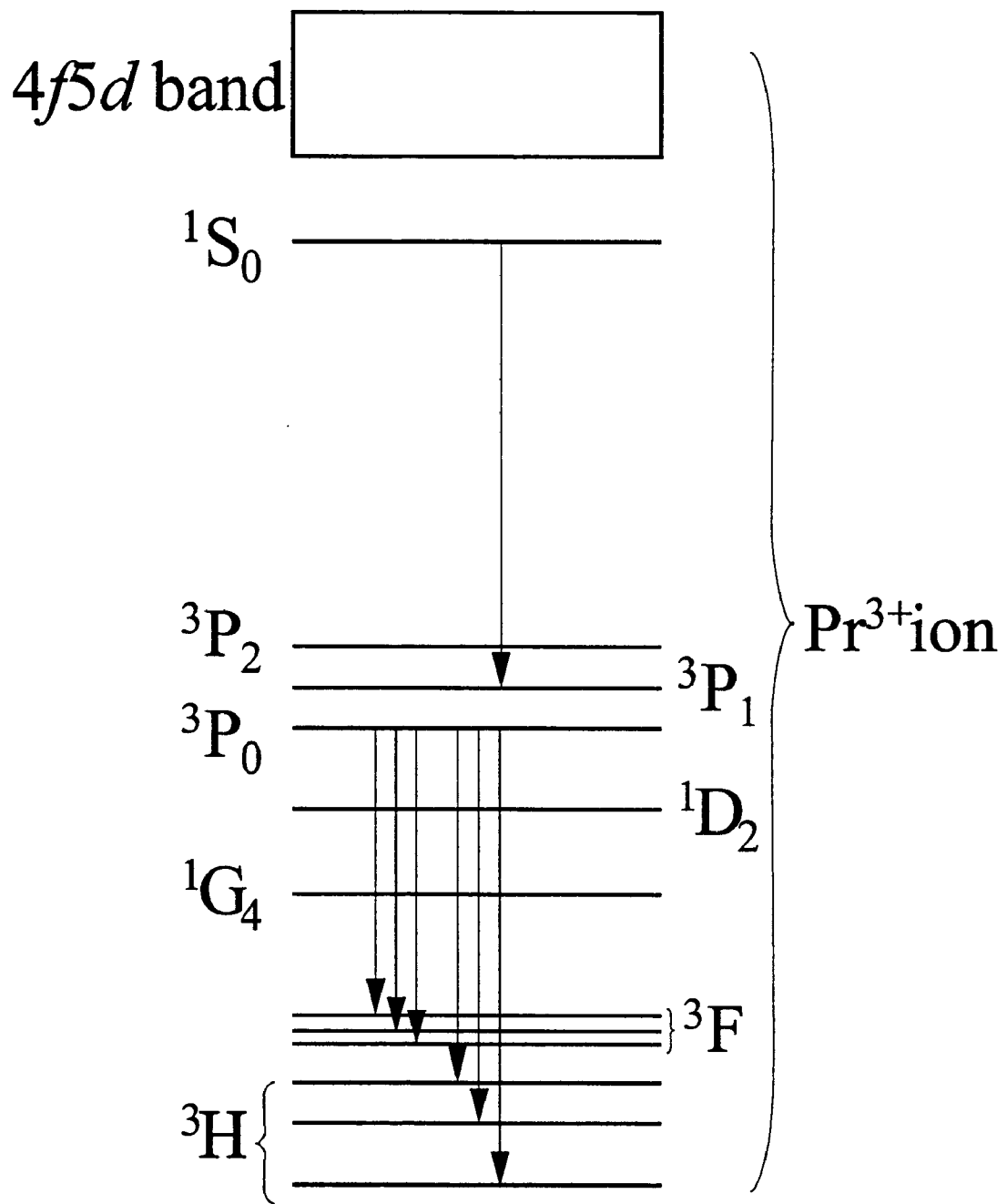
FIG. 2 is an energy level diagram of the energy levels of $Pr^{3+}$ ions illustrating quantum cutting energy transitions.
Figure 3:
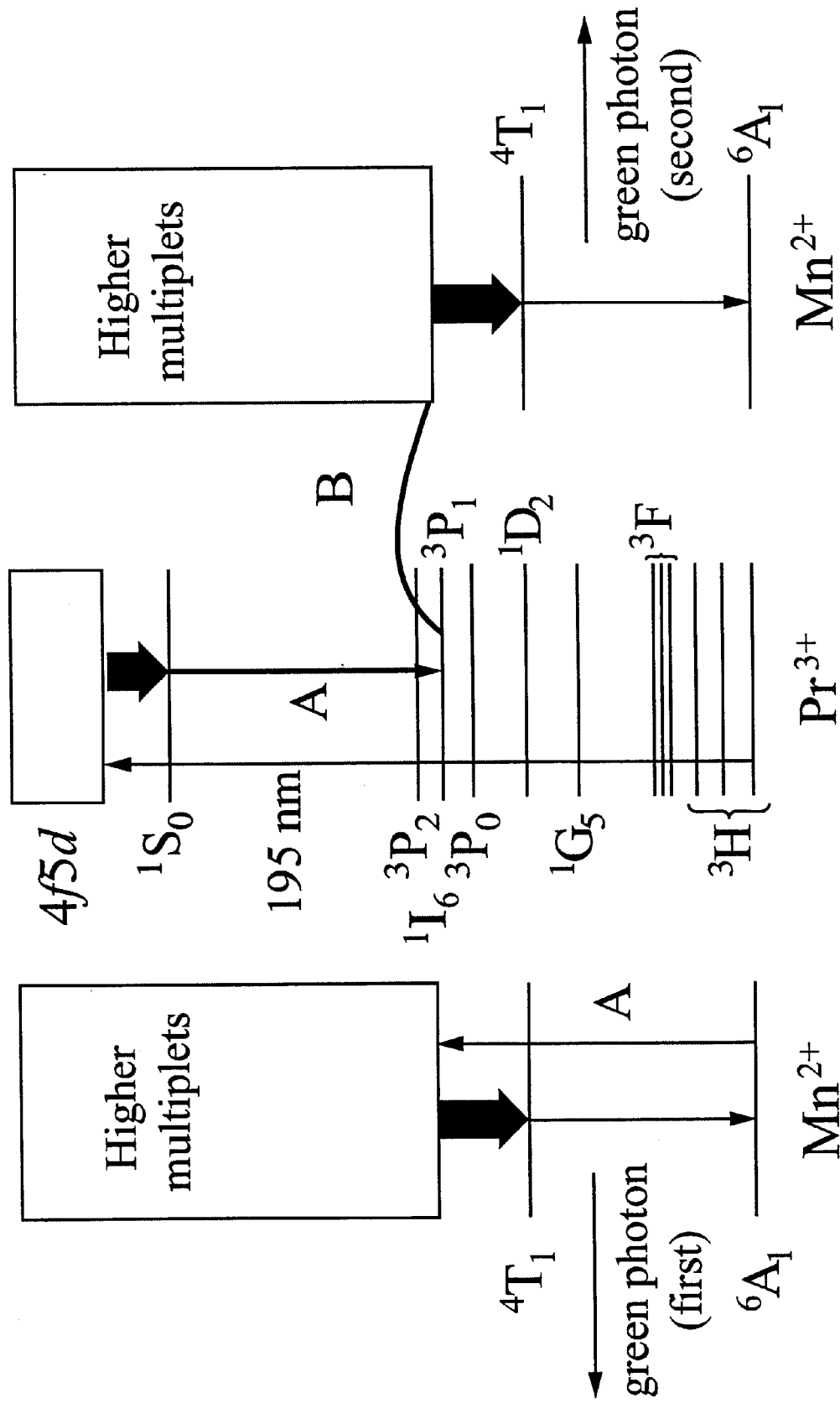
FIG. 3 is a three-part energy level diagram indicating energy level transitions providing quantum cutting for a Pr-doped oxide lattice including Mn activator atoms according to an embodiment of the invention.

An example of the energy transfers that can occur in an oxide-based lattice phosphor doped with Pr and containing Mn activator atoms is schematically illustrated in FIG. 3. As illustrated in the central part of that figure, UV light having a wavelength of 195 nm excites an electron of a $Pr^{3+}$ ion to the 5d energy level. That electron quickly relaxes into the $^1S_0$ energy level, which is the initial state for the two transitions constituting the quantum cutting phenomenon that produces two visible light photons. In the first step of these transitions, the excited electron makes an $^1S_0$-$^1I_6$ transition, radiating light having a wavelength of 401 nm. This transition is followed by other transitions, $^3P_0$-$^3F$, $^3H$ producing photons of visible light. In FIG. 3, the first transition is labeled A and transfers energy to an $Mn^{2+}$ ion when Mn is the activator atom in the lattice. The Mn lattice transition then produces the first photon of the phenomenon, in this case light having the color green. Thereafter, the $Pr^{3+}$ ion further relaxes, producing an energy transfer to a second of the activator atoms, i.e., $Mn^{2+}$ ions, labeled B in FIG. 3, to produce a second photon of green light. In other words, in response to the incidence of the pumping UV photon, an electron of a $Pr^{3+}$ dopant atom is excited and, after some relaxation, falls in energy, emitting light and exciting a first Mn activator atom that, in turn, emits a visible photon. Thereafter, the electron transfers energy to a second activator atom and returns to a lower energy state without radiation. The second activator atom then radiates a second photon having the same wavelength as the photon radiated by the first activator atom.

In order to confirm the design of the oxide-based lattice phosphor, a host material of $SrAl_{12}O_{19}$ was synthesized in a solid state reaction. Strontium carbonate was stoichiometrically mixed with aluminum oxide and doped with $Pr_2O_5$ to supply Pr. Magnesium carbonate was added so that the magnesium could function as a charge compensator. Both aluminum fluoride and ammonium fluoride were used as fluxes in firing the mixture at a temperature of 1,350 °C. for about two hours in a mixture of argon and hydrogen. It was determined that a second firing in a reducing atmosphere after the initial firing improved quantum efficiency. Approximately a 50% improvement in brightness of the emitted light was achieved when the second firing process was employed. A further, 10%, improvement was achieved when the flux was ammonium fluoride rather than aluminum fluoride, probably due to the elimination of residual aluminum compounds in the phosphor. Still higher brightness was achieved when the strength of the reducing atmosphere was increased by including graphite powder within the precursor mixture in a 5% (v/v) hydrogen atmosphere. These conditions resulted in better activation of the Pr ions, yielding the improved brightness. The samples producing the greatest brightness included 4% Pr (at%).

Figure 4:
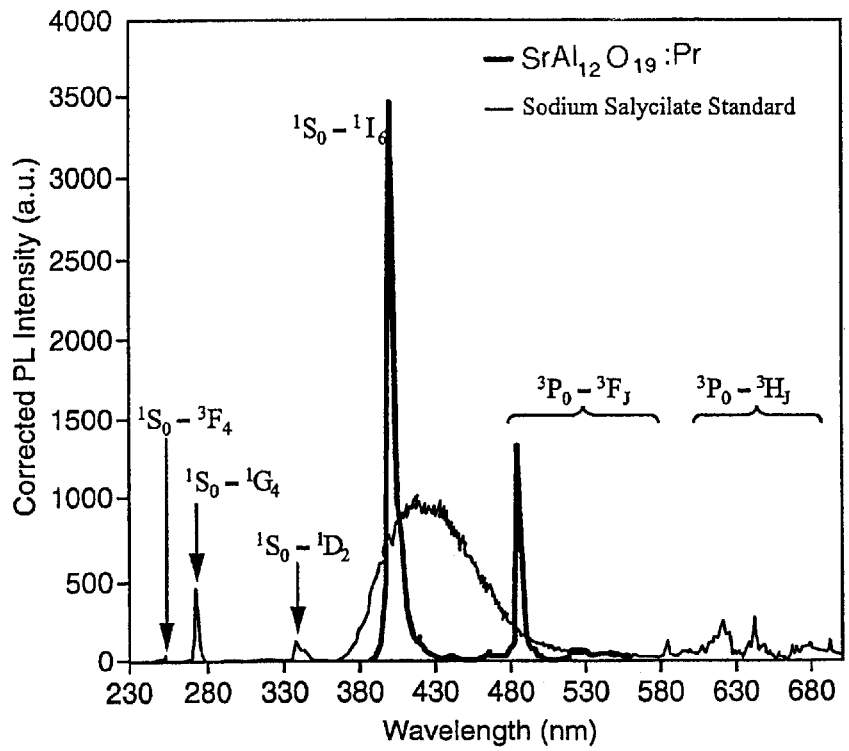
FIG. 4 shows photoluminescence spectra of a oxide-based lattice phosphor doped with Pr exhibiting the quantum cutting phenomenon according to the invention.
Figure 5:
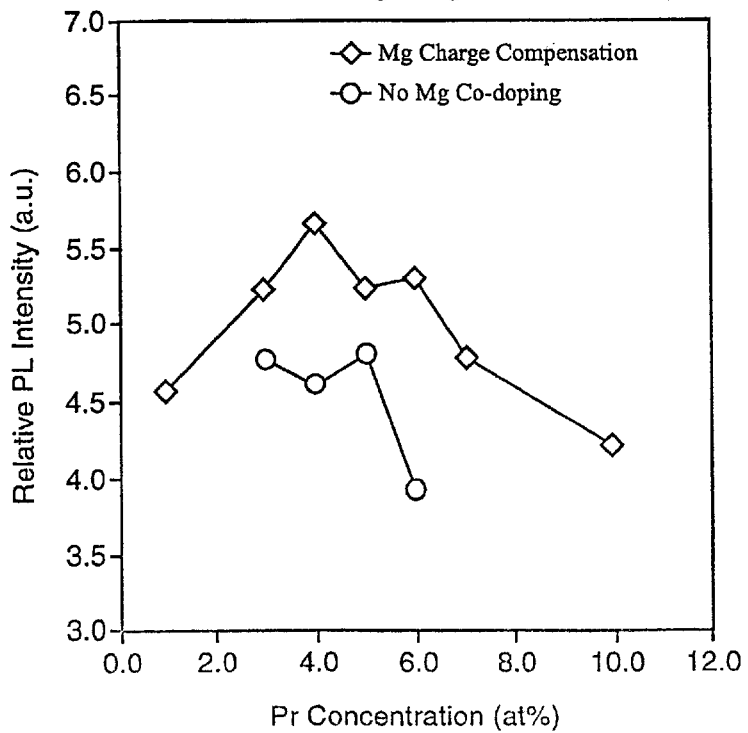
FIG. 5 is a graph showing the photoluminescence intensity of emitted light with a wavelength of 401 nm as a function of Pr dopant concentration in an oxide-based lattice phosphor according to the invention.

FIG. 4 is a photoluminescence spectrum of a Pr-doped $SrAl_{12}O_{19}$ phosphor including Mn as an activator. The figure shows the dominant light emission at a wavelength of 401 nm due to the initial $^1S_0$-$^1I_6$ energy transition of the $Pr^{3+}$ ions. The second largest band of light emission occurred at a wavelength of 486 nm, corresponding to the $^3P_0$-$^3H_4$ energy transition. Since the $^3P_0$ of the second transition producing the light of wavelength 486 nm was populated through the first energy transition ($^1S_0$-$^1I_6$), followed by a non-radiative relaxation, the simultaneous observation of light wavelengths corresponding to $^1S_0$-$^1I_6$ and $^3P_0$-$^3H_4$ directly confirms the existence of the quantum cutting phenomenon. The success of this quantum cutter lattice in producing the desired two visible light photons critically depends upon maximizing the probability of the $^1S_0$-$^1I_6$ energy transitions with regard to competing energy transitions, particularly a transition that produces relatively strong light emission at a wavelength of 273 nm. This result is achieved in the invention because the ratio of visible light to UV light was observed to be 11.5, significantly larger than the same ratio for a fluoride-based lattice, for example, $YF_3$ doped with Pr. Thus, a quantum efficiency exceeding 100% is expected for oxide-based lattice phosphors according to the invention.

Our experiments demonstrated that the Pr concentration producing a maximum radiation at the 401 nm wavelength was 4% (at%), with a decline in the intensity of that wavelength emission as the concentration of Pr increased. Further, it appeared that the addition of magnesium as a co-dopant for charge compensation within the oxide-based lattice phosphor was very important in realizing high quantum efficiency. Although attempts to replace some of the Sr atoms with Ba, Ca, Zn, and La were made, the luminescence intensity decreased when these substitutions were made, probably because the oxide-based lattice phosphors tested were not monocrystalline. Monocrystalline lattice phosphors should produce much higher quantum efficiencies.

Figure 6A:
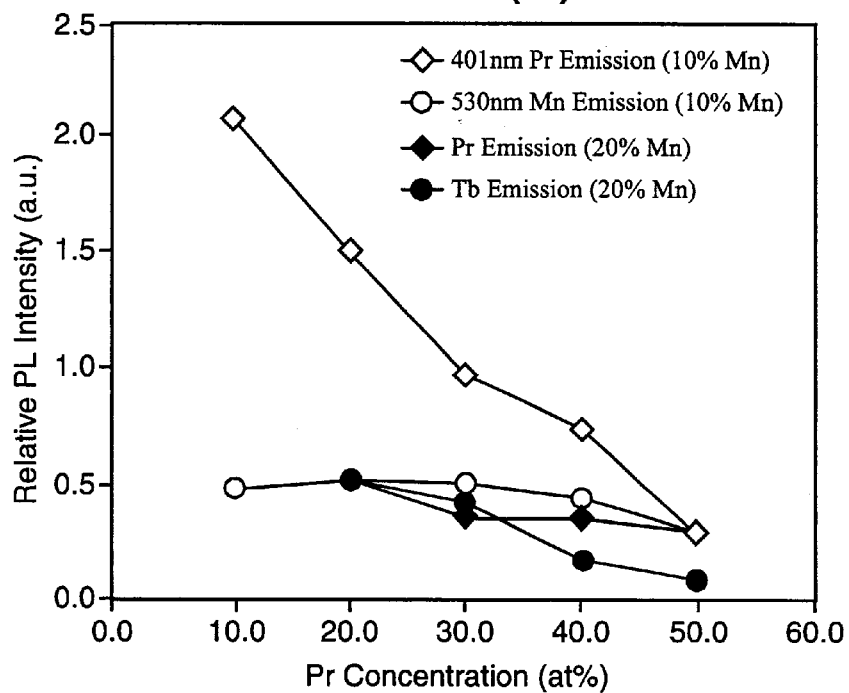
FIGS. 6(a) and 6(b) are graphs of photoluminescence intensity with respect to the concentration of Pr in an oxide-based lattice phosphor according to the invention including respective activator atoms.
Figure 6B:
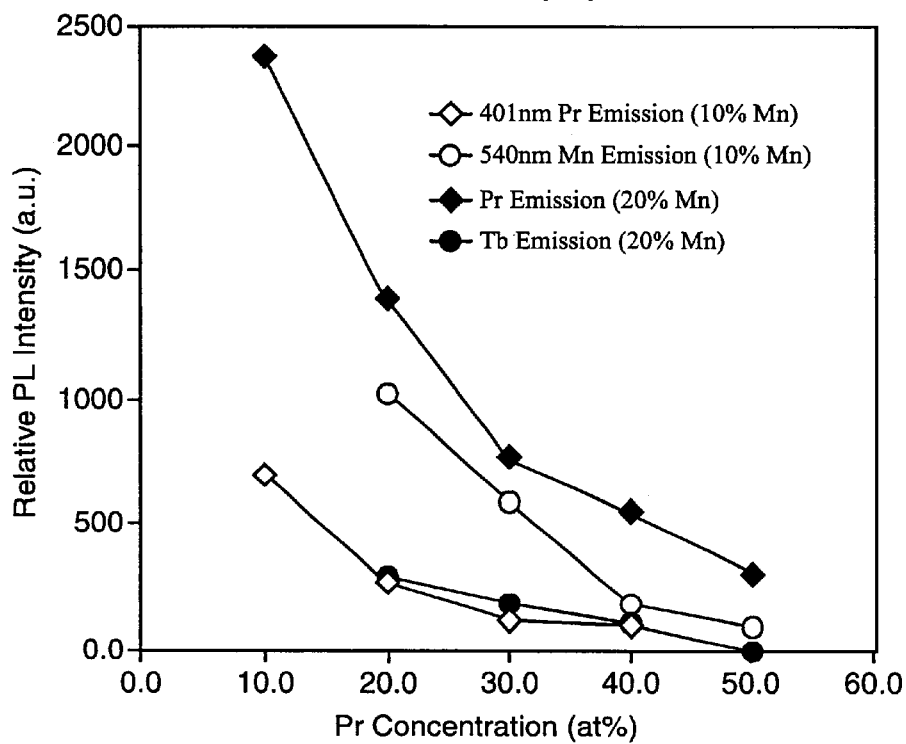

Oxide-based lattice phosphors respectively including Mn and Tb as activator atoms were prepared. FIG. 6(a) is a graph of measured photoluminescence spectra for lattices including Mn, illustrating the change in luminescence spectra as a function of Pr concentration. The lines plotted in FIG. 6(a) represent light emissions due to the indicated atoms, Pr emission from Pr, at a wavelength of 401 nm for the $^1S_0$-$^1I_6$ transition, and, generally, Mn emission from Mn at a wavelength of 530 nm, and Tb emission from Tb. FIG. 6(b) shows photoluminescence spectra for a lattice including Tb as the activator atom. The light intensities plotted in FIG. 6(b) are for the same atomic light sources as the intensities plotted in FIG. 6(a). Both figures show that the Pr luminescence decreased rapidly with increased Pr concentration, probably due to the formation of secondary phases at high Pr concentrations. These spectra suggest that monocrystalline phosphors should be used at high Pr concentrations. The figures also show that the Mn and Tb emission intensities remain essentially unchanged even when their concentration (at%) doubles. These results suggest that only a limited amount of these activators are being incorporated into the lattice to participate in the quantum cutting phenomenon. Further enhancements in processing should increase the concentration of active dopants in activators, with a corresponding increase in external quantum efficiency, exceeding 100%.

Proof that quantum cutting is occurring in the Pr-doped oxide-based lattice phosphors according to the apparatus is obtained by simultaneously observing the $^1S_0$-$^1I_6$ transition, producing light at a wavelength of 401 nm, and lower energy transitions which, for example, produce green light at a wavelength of 480 nm, in the case of using Mn as the activator, and red light at a wavelength of 610 nm, in the case of using Tb as the activator.

Figure 7:
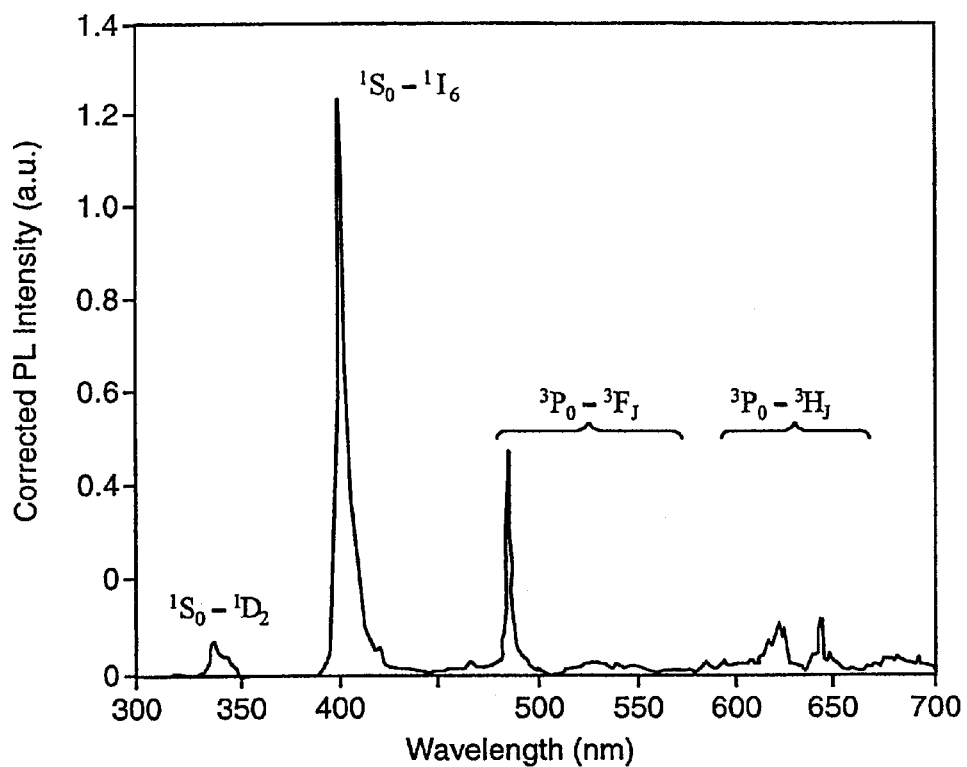
FIG. 7 is a photoluminescence spectrum of the Pr-doped oxide-based lattice phosphor according to the invention showing emission at a wavelength of 401 nm.

FIG. 7 shows the photoluminescence spectrum of Pr-doped $SrAl_{12}O_{19}$ in which light emissions at 401 nm and green light at 480 nm were observed. This spectrum unambiguously proves that quantum cutting according to the phosphor design is occurring. In our experiments, the tested material exhibited a total visible quantum efficiency greater than that of a commercially available phosphor, illustrating the commercial potential of this system.

Figure 8:
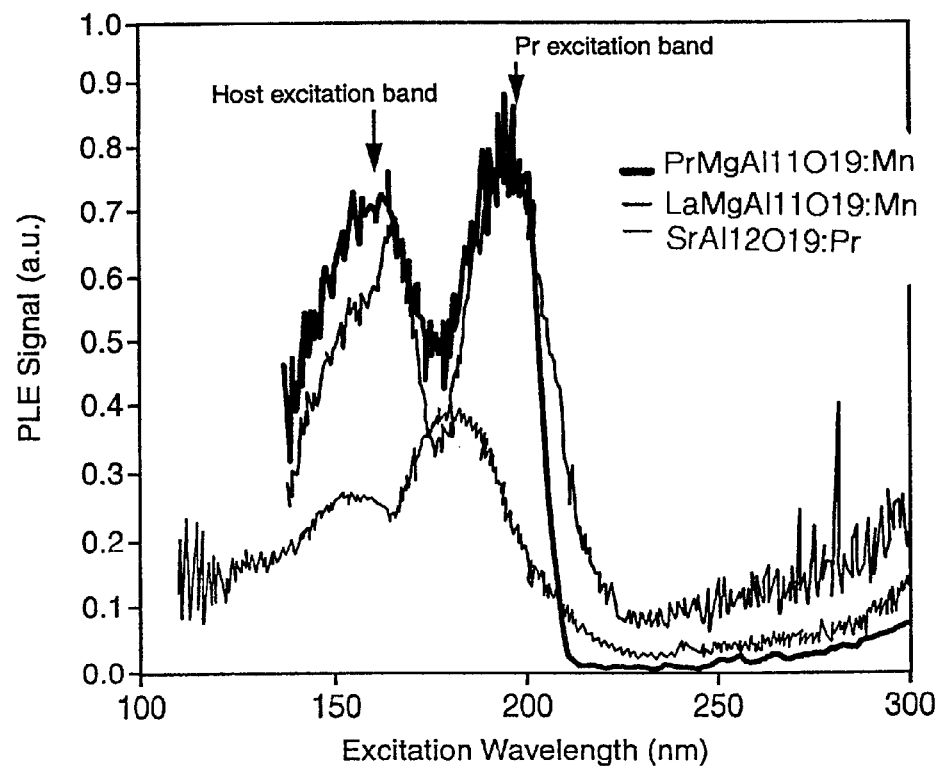
FIG. 8 shows photoluminescence excitation spectra for an oxide-based lattice phosphor with only Pr doping, with doping of both Pr and Mn, and with only Mn doping.

Photoluminescence excitation (PLE) spectroscopy may be used to monitor the excitation process specific to an ion. In other words, PLE may be employed to identify an energy transfer process involved in the excitation of a certain type of ion, for example, Mn, when used as the activator. Three PLE spectra are shown in FIG. 8. In the first of those spectra, the energy transition of the $Pr^{3+}$ ion producing the 401 nm wavelength emission exhibited two excitation bands, one centered at a wavelength of 195 nm and a second centered at a wavelength of 160 nm. The first excitation band is attributable to direct absorption of light by the 5d energy levels within the $Pr^{3+}$ ions and the second band is due to host absorption with subsequent transfer from the host to $Pr^{3+}$ ions.

The second PLE spectrum is the excitation spectrum of $Mn^{2+}$ emission at a wavelength of 530 nm when the Mn activator atoms are present. Again, two excitation bands were observed and those bands are at the same positions as in the system doped solely with Pr. This result is a clear indication that the emission attributable to the presence of the Mn activator is coupled with the quantum cutting transition of the $Pr^{3+}$ ions.

The third PLE spectrum is measured for a system in which only the Mn activator ions are present without any Pr. In this system, the absorption band at a wavelength of 195 nm was completely absent, further proving the Mn coupling with the Pr quantum cutting transition. These spectra conclusively demonstrate that the observed light emissions in this phosphor system correspond to those of the energy level design, producing two visible light photons in response to a single UV pumping light photon.

We claim:

1. A method of producing two visible light photons from an oxide-based phosphor comprising $SrAl_{12}O_{19}$ doped with praseodymium (Pr) and including atoms of at least one activator comprising at least one of terbium and europium in response to excitation with a single ultraviolet light photon, the method comprising exciting the Pr of the oxide-based phosphor with a photon of ultraviolet light to excite an electron to an excited state, the excited electron falling to a lower energy state in a non-radiative transition and transferring energy to excite a first activator atom in the oxide-based phosphor, the first activator atom emitting a first photon of visible light, and the excited electron falling further to a lower energy state in a non-radiative transition, transferring energy to excite a second activator atom in the oxide-based phosphor, the second activator atom emitting a second photon of visible light.

2. The method of claim 1 wherein the oxide-based phosphor includes magnesium as a dopant.

3. The method of claim 1 wherein the Pr is present in the oxide-based phosphor in a concentration not exceeding four atomic percent.

4. An oxide-based phosphor comprising $SrAl_{12}O_{19}$ doped with praseodymium (Pr) and including atoms of at least one activator comprising at least one of terbium and europium and emitting two visible light photons in response to excitation with a single ultraviolet light photon.

5. The oxide-based phosphor of claim 4 wherein the oxide-based phosphor includes magnesium as a dopant.

6. The oxide-based phosphor of claim 4 wherein the Pr is present in the oxide-based phosphor in a concentration not exceeding four atomic percent.

* * * * *